Dec. 15, 1953

A. W. HALL 2,662,544

DRAIN VALVE MECHANISM FOR FLUID PRESSURE SYSTEMS

Filed Feb. 11, 1950

INVENTOR.
AXEL W. HALL
BY Owen W. Kennedy
Attorney

Patented Dec. 15, 1953

2,662,544

UNITED STATES PATENT OFFICE 2,662,544

DRAIN VALVE MECHANISM FOR FLUID PRESSURE SYSTEMS

Axel W. Hall, Still River, Mass.

Application February 11, 1950, Serial No. 143,790

4 Claims. (Cl. 137—204)

The present invention relates to fluid pressure systems, particularly air pressure systems employed on moving vehicles, and has for its object to provide an improved valve mechanism for automatically draining liquid, and other foreign matter, from the pressure storage reservoir of such a system.

In the normal operation of air pressure systems, such as those employed for operating the air brakes and other auxiliary apparatus of motor buses, trucks and other heavy vehicles, it has been found that liquid, mostly in the form of water, will collect within the system, due to the condensation of moisture that is present in the air. When this water, which is often mixed with oil and sludge, is not drained, its presence will interfere with the operation of the system, and may render the system entirely inoperative, due to its freezing in cold weather. While manually operated drain valves have been employed, it is difficult to insure the operation of such valves at regular intervals.

According to the present invention, there is provided a drain valve mechanism, which may be readily applied to the reservoir of any existing air pressure system, with the valve mechanism functioning automatically to cause the periodic discharge of liquid from the system in response to variations of pressure within the reservoir. The valve mechanism of the present invention is particularly characterized by its simplicity of construction, its ready application to any pressure storage reservoir, or other receptacle at a low point in the system, and the fact that the mechanism operates automatically without the use of springs, or parts that are liable to get out of adjustment.

The above, and other advantageous features of the invention will hereinafter more fully appear from the following description when considered in connection with the accompany drawings, in which, Fig. 1 is a diagrammatic showing of an air pressure system to which my improved drain valve mechanism has been applied.

Figure 1:
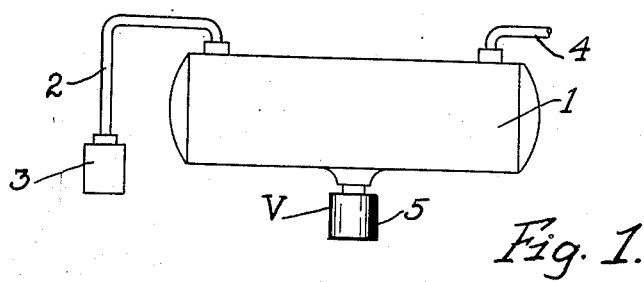

Referring first to Fig. 1, the fluid pressure system to which my valve mechanism V is applied, includes a storage reservoir 1 supplied with air under pressure, through a conduit 2 leading from a suitable compressor 3. The reservoir 1 functions to store air under pressure for use by various types of air operated apparatus, such as vehicle brakes, with the air passing to such apparatus through a conduit 4, leading from the reservoir 1.

Figure 2:
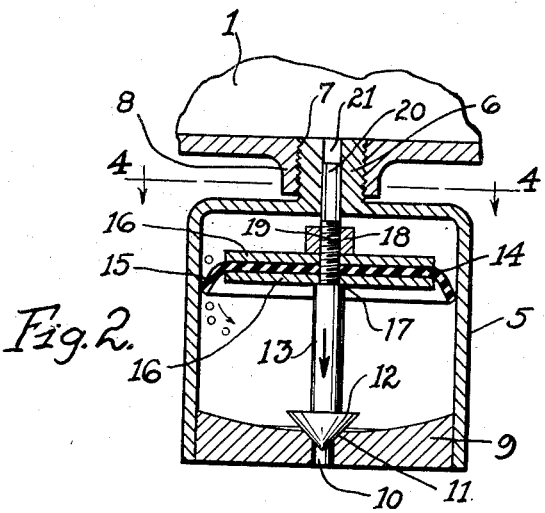
Fig. 2 is a vertical sectional view, on an enlarged scale, of the valve mechanism shown in Fig. 1 in its closed position.

As best shown on an enlarged scale in Fig. 2, the valve mechanism V comprises a cylindrical casing 5 substantially closed at its upper end, which provides an externally threaded nipple 6, screwed into a threaded opening 7 extending through a boss 8 formed on the bottom of the reservoir 1. The opposite end of the casing 5 is open to receive a head 9 in the form of a disc threaded or otherwise fitted into the end of the casing, so as to form an air-tight closure for the casing when the parts of the valve have been assembled therein.

The head 9 provides a centrally located port 10 surrounded by a conical seat 11 for receiving a valve 12 carried at the lower end of a stem 13. The valve stem 13 carries a piston 14, which is shown as being in the form of a cup-shaped washer composed of yieldable material, such as rubber or leather, with the outer rim or flange 15 of the piston being slightly larger than the inside of the casing 5. It is to be noted that the edge of the flange 15 faces in the direction of the valve 12, so that entry of the piston 14 into the casing 5 will serve to slightly compress the flange 15.

The central portion of the piston 14 is held between plates 16, the lower one of which engages a shoulder 17 provided by the stem 13, and a nut 18 serves to hold the plates 16 in close engagement with the flat surface of the piston 14 by its co-operation with threads 19 formed on a reduced portion 20 of the stem 13 above the shoulder 17. Therefore, when the parts of the piston are assembled on the stem 13, the central portion of the piston 14 is relatively stiff, with the flange 15 surrounding this central portion being relatively flexible, for a purpose which will later appear.

Figure 4:
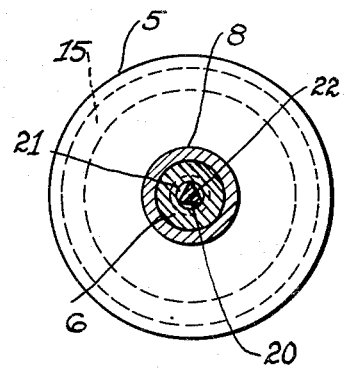
Fig. 4 is a horizontal sectional view along the line 4—4 of Fig. 2, looking in the direction of the arrows.

The reduced portion 20 of the valve stem 13 extends freely into an opening 21 formed in the nipple 6. As best shown in Fig. 4, the sides of the stem portion 20 are flattened at 22, so that air under pressure within the reservoir 1 will always be admitted freely to the upper portion of the casing 5, above the piston 14, when the valve occupies the closed position of Fig. 2. Thus, the upper portion 20 of the valve stem 13 serves as a guide to keep the central axis of the stem 13 in alignment with the port 10 at the lower end of the casing, with the rounded corners between the flattened portions 22 sliding freely within the opening 21.

When the parts of the valve mechanism are assembled within the casing 5, the stem 13 normally occupies the position of Fig. 2, with the port 10 closed. Therefore, when the valve assembly is applied to the reservoir 1, air under pressure enters the casing 5 through the opening 21, and this pressure acting on the top of the piston 14, serves to firmly press the valve 12 in engagement with the seat 11 surrounding the port. After the air in the reservoir 1 has been under pressure for an appreciable time, the pressure on opposite sides of the piston 14 will equalize, due to the fact that the piston flange 15, being yieldable inwardly to pressure exerted on its upper surface will allow the air to seep between its edge and the inner wall of the casing 5. Furthermore, any condensed moisture collecting at the bottom of the reservoir in the form of water mixed with oil, will flow downwardly through the opening 21 into the space above the piston 14, and will ultimately seep with the air past the flexible flange 15 of the piston 14, as indicated in Fig. 2. This moisture will then collect at the bottom of the casing 5 around the valve 12, which is then held tightly in engagement with its seat 11 by the air pressure in the reservoir 1.

Figure 3:
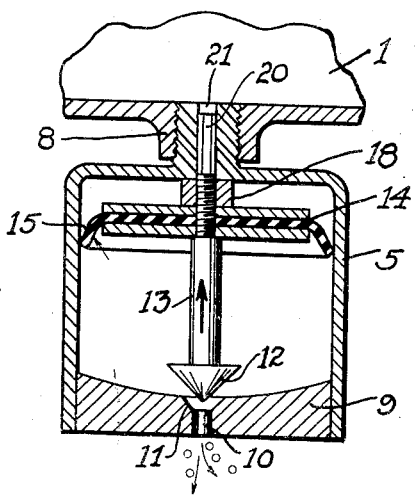
Fig. 3 is a sectional view, similar to Fig. 2, showing the valve mechanism in its open position.

Assuming that the air pressure in the reservoir 1 is normally maintained at 100 pounds per sq. in., the air pressure on opposite sides of the piston 14 will also be 100 pounds. Therefore, as long as the pressure remains the same on both sides of the piston 14, the valve 12 will be held in engagement with the seat 11 surrounding the port 10. However, should the air pressure in the reservoir 1, fall below 100 pounds, due to the use of the air for operating apparatus in the system, such as brakes, then air above the piston 14 will have its pressure reduced, say to 95 pounds, while air below the piston will remain at the original pressure of 100 pounds. As soon as this condition occurs, an upward force will be exerted on the piston 14 by this residual air pressure below the piston which is sufficient to move the piston into the position of Fig. 3, wherein the valve 12 has been raised above its seat 11 with upward movement of the piston 14 being limited by the nut 18. This lifting of the valve 12 is immediately followed by discharge of the accumulated moisture through the port 10, as indicated by the arrows.

As soon as this discharge of moisture through the port 10 occurs, the accompanying escape of air from below the piston 14 into the atmosphere, will reduce the pressure to a value below the 95 pounds of pressure remaining in the space above the piston, whereupon the valve stem 13 will again move downwardly into the position of Fig. 2 to close the port 10 of the valve 12. Such valve closure will be followed by the above described seepage of air under pressure and moisture into the space below the piston 14, as equalization of pressure again takes place, as before, whereupon the cycle of operation of the valve mechanism will repeat itself, upon the occurrence of a further reduction in the pressure within the reservoir 1, such as from 95 pounds to 90 pounds. The values of air pressure stated above are given for purposes of illustration only, it being obvious that the initial equalization of pressures on opposite sides of the piston will occur at any given pressure that is normally maintained in the system, and that any substantial reduction of this normal pressure will result in automatic opening of the valve 12, due to the existence of a residual pressure below the piston 14 in excess of whatever pressure may then be above the piston, due to its direct communication with the reservoir 1.

From the foregoing, it is apparent that by the present invention, there is provided an improved valve mechanism that operates to clear the system of accumulated moisture, at frequent intervals, automatically determined by variations of pressure within the system resulting from the normal use of the pressure median in operating various types of apparatus. While for purposes of illustration, the valve mechanism is shown as being applied to a pressure storage reservoir, obviously it would function just as effectively when applied to a drainage receptacle located at a low point in the system, where it will be subjected to the pressure of the system.

I claim:

1. A drain valve device for a fluid pressure system comprising in combination, a casing providing a smooth-wall cylinder having an opening in its upper end and having its lower end provided with a discharge port, a piston movable within said cylinder and carrying a valve portion responsive to downward movement of said piston to close said discharge port, said piston having a portion of flexible material around its periphery with a flange facing in the direction of said discharge port so as to yield inwardly in response to pressure in the upper portion of said cylinder to permit the passage of fluid and moisture to the lower portion of said cylinder when said piston moves downwardly to cause said valve portion to close said discharge port, accompanied by equalization of pressure on opposite sides of said piston, and with the peripheral portion of said piston yielding outwardly to prevent passage of fluid and moisture from the lower to the upper portion of said cylinder in response to a decrease of system pressure below the pressure in the lower portion of said cylinder, accompanied by upward movement of said piston to disengage its valve portion from said port for discharging through it fluid and moisture from the lower portion of said cylinder to the atmosphere, until pressures on the opposite sides of said piston are again equalized.

2. A drain valve device for a fluid pressure reservoir comprising in combination, a cylinder having an opening in its upper end providing a passage extending into said cylinder, said cylinder being closed at its lower end, except for an exhaust port, and a piston assembly movable within said cylinder comprising a rod extending axially thereof, with the lower end of said rod providing a valve portion engageable with said discharge port and the upper end of said rod being guided for movement in said passage, and with the intermediate portion of said rod carrying a rigid portion of less diameter than the bore of said cylinder and a second portion of flexible material having a diameter greater than that of said cylinder bore, so that when said piston assembly is placed within the cylinder said flexible portion will be compressed to provide a flange engaging the cylinder wall and yieldable inwardly to allow passage of fluid and moisture from said reservoir while permitting downward movement of said piston to close said discharge port by said valve portion.

3. A drain valve device for a fluid pressure reservoir comprising in combination, a cylinder having an opening in its upper end providing a passage extending into said cylinder, said cylinder being closed at its lower end, except for an exhaust port, and a piston assembly movable within said cylinder comprising a rod extending axially thereof, with the lower end of said rod providing a valve portion engageable with said discharge port and the upper end of said rod being guided for movement in said passage, and with the intermediate portion of said rod providing a shoulder on which is mounted a pair of rigid discs of less diameter than the cylinder bore, and a disc of flexible material held between said rigid discs, said flexible disc being of greater diameter than the cylinder bore so that when said piston assembly is placed within said cylinder the peripheral portion of said disc will flex inwardly in the direction of said valve portion to yieldingly engage the cylinder wall and permit the passage of fluid and moisture beyond said piston.

4. A drain valve device for a reservoir containing a fluid pressure medium comprising in combination, a cylinder having one end provided with a passage and having its other end provided with an opening surrounded by a seat, a rod extending axially of the cylinder with one end guided for movement within said cylinder passage and having its other end provided with a valve portion engageable with said seat, and a piston mounted on said rod between the ends thereof, said piston comprising a rigid portion of less diameter than the bore of said cylinder and a second portion of flexible material of greater diameter than said cylinder bore, whereby the placing of said rod and piston within the cylinder will serve to flex the periphery of said flexible piston portion in the direction of said valve portion to yieldingly and slidably engage the cylinder wall and permit the passage of pressure medium and moisture from beyond said piston when movement of the piston has engaged said valve portion with said seat.

AXEL W. HALL.

References Cited in the file of this patent

UNITED STATES PATENTS

| Number | Name | Date |
|---|---|---|
| 2,125,144 | Aikman | July 26, 1938 |
| 2,232,899 | Aikman | Feb. 25, 1941 |
| 2,233,818 | Matter | Mar. 4, 1941 |